June 29, 1965 E. CORDIANO 3,191,999
HYDRAULIC BRAKING SYSTEM FOR VEHICLES
Filed Sept. 9, 1963 8 Sheets-Sheet 3

June 29, 1965     E. CORDIANO     3,191,999
HYDRAULIC BRAKING SYSTEM FOR VEHICLES
Filed Sept. 9, 1963     8 Sheets-Sheet 4

Fig. 8

United States Patent Office 3,191,999
Patented June 29, 1965

3,191,999
HYDRAULIC BRAKING SYSTEM FOR VEHICLES
Ettore Cordiano, Turin, Italy, assignor to Fiat Società per Azioni, Turin, Italy
Filed Sept. 9, 1963, Ser. No. 307,485
Claims priority, application Italy, Oct. 26, 1962, 21,167/62
6 Claims. (Cl. 303—22)

This invention relates to a device for use on vehicles equipped with hydraulic brakes, and is adapted to vary the braking force on vehicle wheels depending upon the wheel load.

Devices are known for varying the braking force on vehicle rear wheels with respect to front wheels and vice versa.

More particularly hydraulic brake pressure varying devices are known and employed for the above mentioned purpose, comprising a cylinder and a piston movable therein, which subdivides the cylinder inside into two chambers and carries a rod extending through one of the said chambers towards which it exposes faces differing in section, a normally open valve controlling intercommunication of the said two chambers, which are connected to the master cylinder and braking circuit for at least one vehicle wheel respectively, the valve selectively controlling by shutting off or intercepting the intercommunication starting from a predetermined and set value of the pressure transmitted to the device by the master cylinder after the piston, which is biased by spring means, has started its movement.

Such devices act as pressure amplifiers or reducers, depending upon whether the chamber having the piston rod extending therethrough and the other chamber are connected to the braking circuit for at least one vehicle wheel and to the master cylinder, respectively, or vice versa.

The devices are interposed in the master cylinder and braking circuit for all vehicle wheels or front wheels only when they act as pressure amplifiers, or between the master cylinders and vehicle rear wheels when they act as pressure reducers.

The devices are in any case not entirely satisfactory in that they distribute the braking force on the rear wheels with respect to the front wheels in a ratio which is predetermined by the physical construction of the device instead of depending upon actual distribution of the load on the front and rear wheels, respectively.

This invention obviates the above drawbacks and provides on vehicles equipped with hydraulic brakes and pressure amplifiers or reducers means whereby operation of the latter is made responsive to the actual load distribution on the various vehicle wheels, as a result of variations in static load and braking.

For the above purpose this invention provides a device for use on vehicles equipped with hydraulic brakes, which is adapted to vary the braking force on vehicle wheels dependently upon the load thereon, characterized by the fact that the device comprises in combination:

(a) At least one pressure varying device of known type, secured to one of at least two vehicle masses separated from each other by the vehicle suspension system and comprising a cylinder and a spring biased piston movable therein, subdividing the cylinder inside into two chambers towards which it exposes faces differing in area, a normally open valve controlling intercommunication of the said two chambers which are connected with the master cylinder and braking circuit for one vehicle wheel at least, respectively, the valve shutting off intercommunication starting from a predetermined value of the pressure transmitted by the master cylinder, after the piston, which is biased by the spring means, has started its movement, (b) Each pressure varying device has associated therewith means comprising a resilient member interposed between the piston and the other one of the above mentioned vehicle masses separated from each other by the vehicle suspension system, the resilient member forming at least a part of the spring means acting on the piston of the pressure varying device.

Further characteristic features and advantages of the device according to this invention will be clearly understood from the appended description of certain embodiments of the device, given by way of nonlimiting examples and shown in the accompanying drawings, wherein.

Corresponding parts are provided throughout the figures with similar reference numerals.

Figures 1, 11:
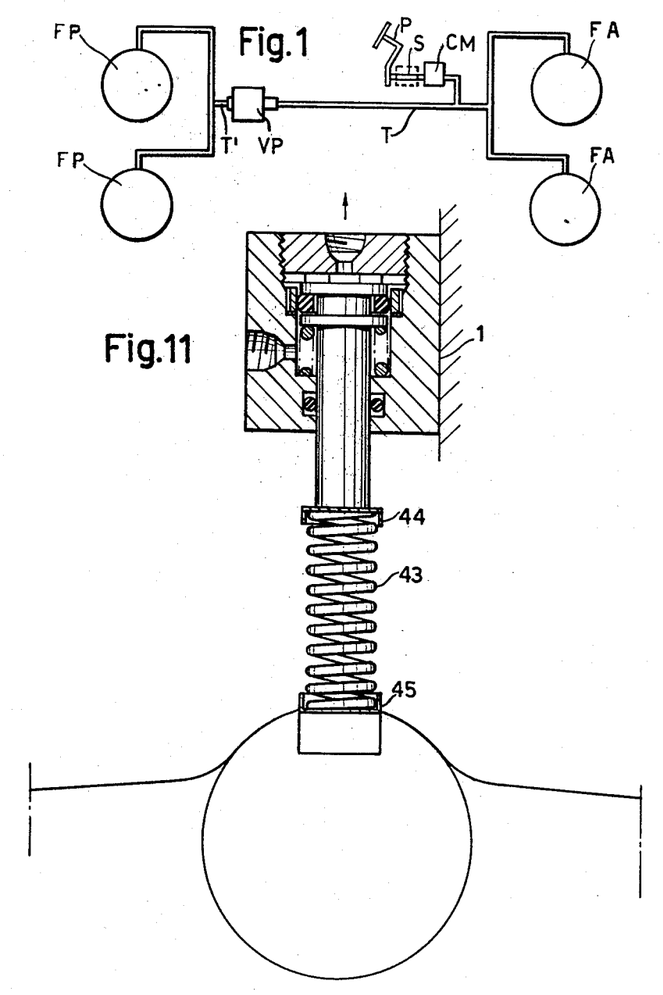
FIGURE 1 shows a diagram of the hydraulic braking circuit on a vehicle, wherein a pressure varying device is interposed between the master cylinder and braking circuit for the rear wheels.
FIGURES 11 and 12 are part sectional elevational views of a further modified construction used on vehicles which do not have and are provided with, respectively, a trimming device.

The general diagram of the braking circuit in FIGURE 1 shows a master cylinder CM operated by a pedal P, if desired through a servo-brake S, and connected through a pipe T with vehicle front wheel brakes FA on the vehicle and through a pressure varying device VP with vehicle rear wheel brakes FP.

Figure 4:
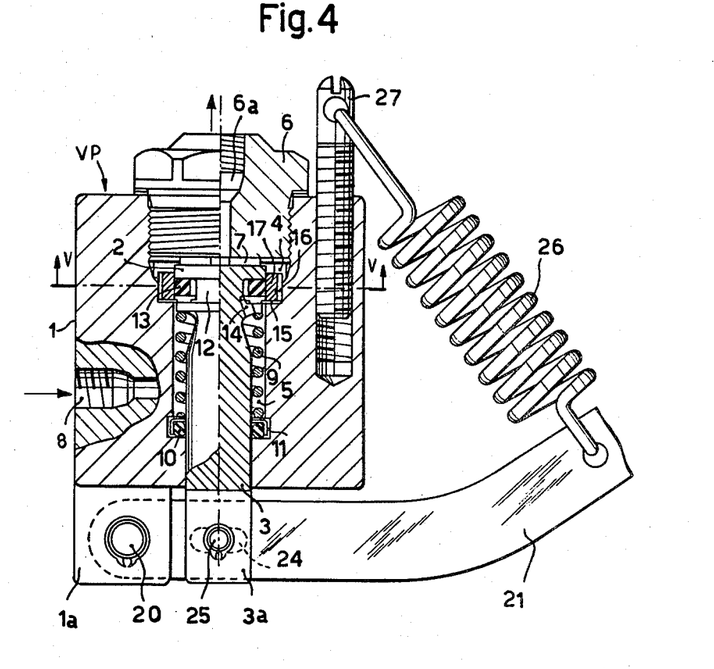
Figure 5:
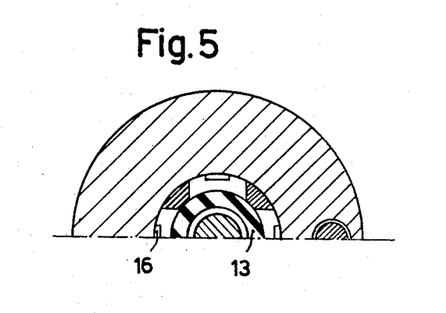

The structure of the pressure varying device which in the specific case acts as a pressure reducer, shall now be described with reference to FIGURE 4 of the drawings.

This structure, which is disclosed per se by applicant's prior patents, comprises a cylinder 1 having movable therein a piston 2 provided with a rod 3, the end 3a of which is fork-shaped and extends beyond the cylinder through an axial bore formed in one end of the chamber housing the piston 2. The latter subdivides the inside of the cylinder into two chambers, namely a chamber 4 having the large face of the piston 2 turned towards it, and a chamber 5 through which the piston rod 3 extends. The chamber 4 is confined in front of the large face of the piston 2 by a plug 6 screwed into a tapped recess in the body of the cylinder 1 and formed with a through axial conduit 6a and means in the form of studs 7 preventing the piston 2 from moving close to the plug. The chamber 5 connects with the outside through a connection 8 and encloses a helical spring 9 coiled around the rod 3, tending to hold the piston 2 close to the studs 7 on the plug 6. The spring 9 is interposed between the piston 2 and an annular seal comprising a rubber ring 10 and a C-shaped cup 11 sealing around the slidable rod 3.

The piston 2 is moreover formed with a circumferential groove 12 receiving a ring 13 of resilient material.

The ring 13 is substantially of rectangular cross-section arcuate in profile on the side by which the ring periphery adheres to the wall of the bore in which the piston 2 moves.

The axial thickness of the ring 13 is substantially smaller than the width of the groove 12, the bore in the ring being larger than the diameter of the groove bottom. The bottom of the groove 12 connects with the chamber 5 through one or a plurality of holes 14 cut through the piston thickness. The groove 12 moreover connects with the chamber 4 through radial grooves 15 and axial grooves 16 cut in the front and circumferential portion, respectively of a ring 17 forced into a recess within the cylinder 1 at the junction of the chambers 4 and 5, the ring matching the chamber 5 in bore.

In order to operate the above described device as a pressure reducer the connections 6a and 8 are connected to the pipe T' leading to the rear wheel brakes and pipe T leading to the master cylinder (compare the diagram in FIG. 1).

The device operates as follows:

On flow of pressure liquid from the master cylinder to the connection 8, liquid flows through the chamber 5, thence through the peripheral clearance between the piston 2 and the inner wall of the chamber 5, hole 14, groove 12, and grooves 15, 16 to the chamber 4.

When the pressure of the liquid from the master cylinder reaches a value such that the total hydraulic thrust on the piston 2 (acting downward as viewed in FIGURE 4) is higher than the thrust on the piston by spring 9, the downward stroke of the piston 2 begins. When the piston has moved forward far enough to cause the annular seal 13 to shut off grooves 15 and prevent liquid flow through the grooves 15, 16, reduction in pressure in the circuit connected with the connection 6a with respect to the pressure transmitted by the master cylinder begins.

The reduction will be effected at a constant ratio depending upon the ratio of the piston areas exposed to the action by the liquid. The characteristic of the reaction spring 9 is decisive with respect to the pressure value at which intervention of the device starts.

Figures 2, 3:
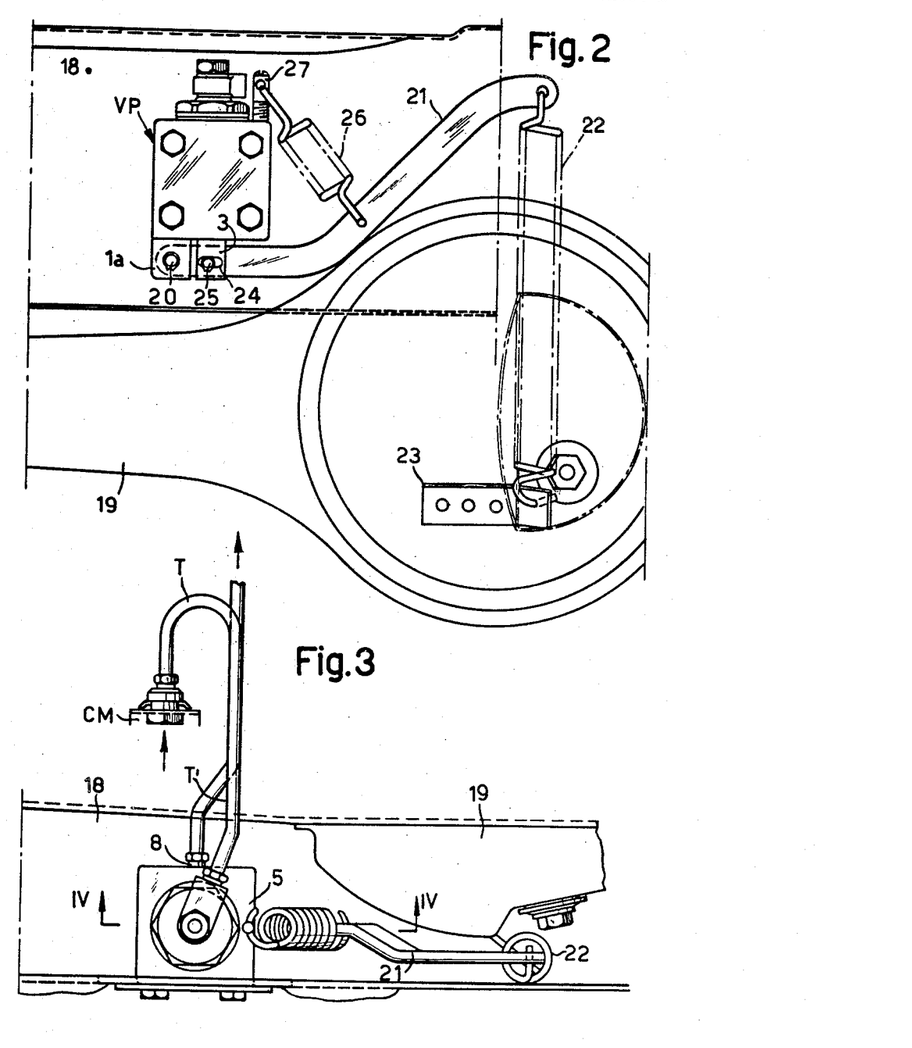
FIGURE 2 is a front elevational view of a device according to this invention, arranged adjacent the rear driven axle of a vehicle.
FIGURE 3 is a plan view of the device shown in FIGURE 2, FIGURES 4 and 5 are sectional views on lines IV—IV of FIGURE 3, and V—V of FIGURE 4, respectively.

The device according to this invention comprises a pressure varying device of the above described type secured to a vehicle body portion 18 adjacent the rear driven axle 19 (FIGS. 2 and 3). A boss 1a on the cylinder has pivoted thereto at fulcrum 20 a lever 21, having hinged to its free end a coil spring 22 fastened at its other end to a strap 23 secured to the driven axle 19 by welding. The lever 21 is moreover connected through an elongated opening 24 to a pivot 25 carried by the end 3a of the piston rod 3.

The arrangement is such that the spring 22 is constantly stretched and therefore coacts with the hydraulic pressure on the piston 2 of the pressure varying device, which results in a change (decrease) in pre-load of the spring 9.

It will be seen that, as load on the driven axle 19 varies, spacing of the end of the lever 21 and strap 23, hence the length of spring 22 and its load on the lever 21 and piston 2 varies. The spring 22 affects operation of the pressure varying device by varying the intervention pressure, that is, the required hydraulic pressure for moving the piston 2 by an extent such as to shut off communication of the chambers 4 and 5. Obviously, variation in spring load 22 results in variation in the shut off pressure of the pressure varying device VP.

The device further comprises a spring 26 interposed between the lever 21 and a screw 27 screwed into a tapped recess in the cylinder 1 of the pressure varying device. The spring 26 coacts with spring 9 and permits reduction in bulk of the latter, as may become necessary when the pressure varying device is of small size.

Figure 6:
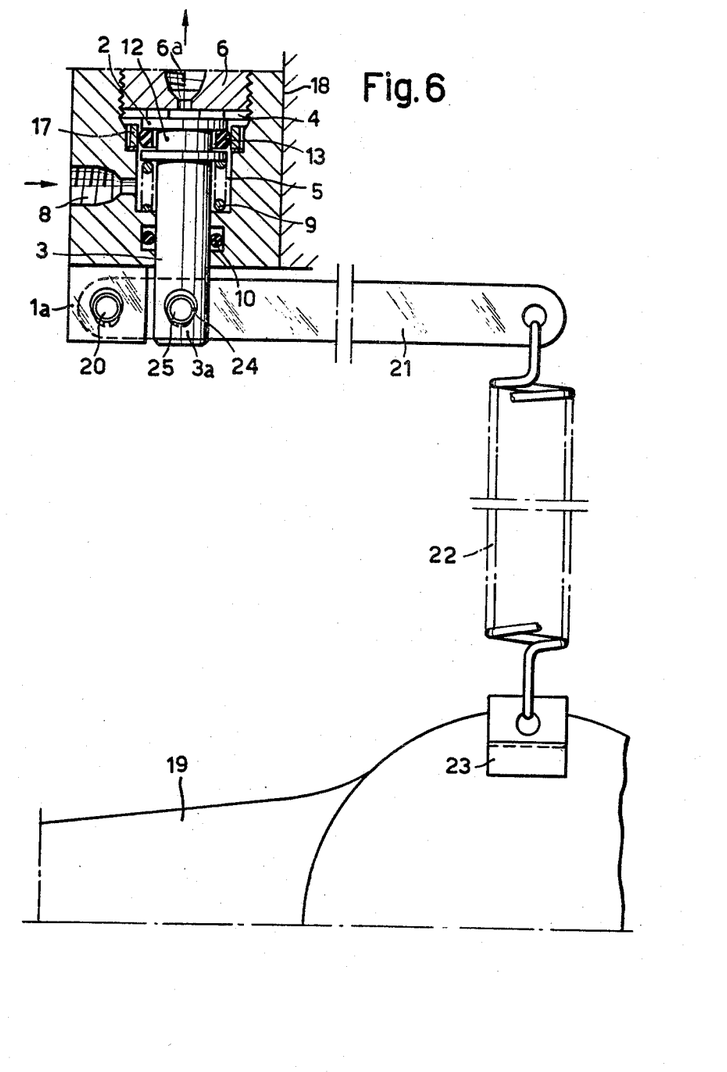
FIGURES 6, 7 and 8 are elevational views similar to FIG. 2, showing three modified embodiments.
Figure 7:
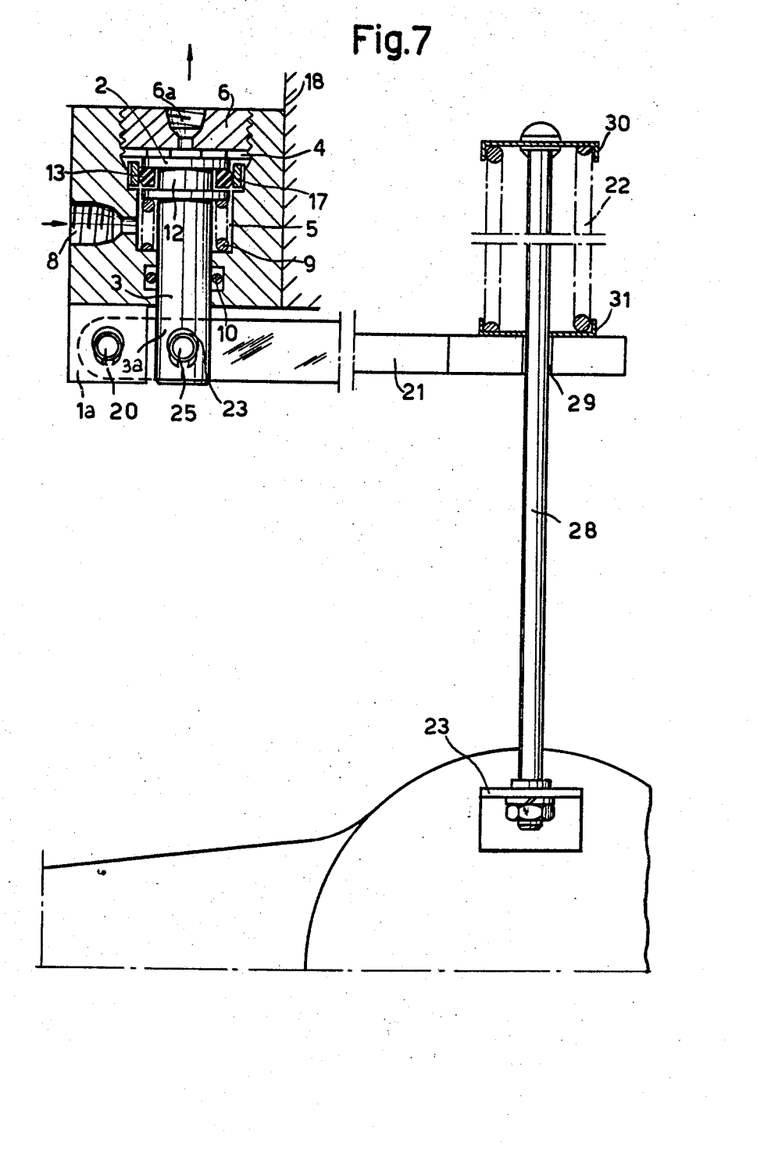
Figure 8:
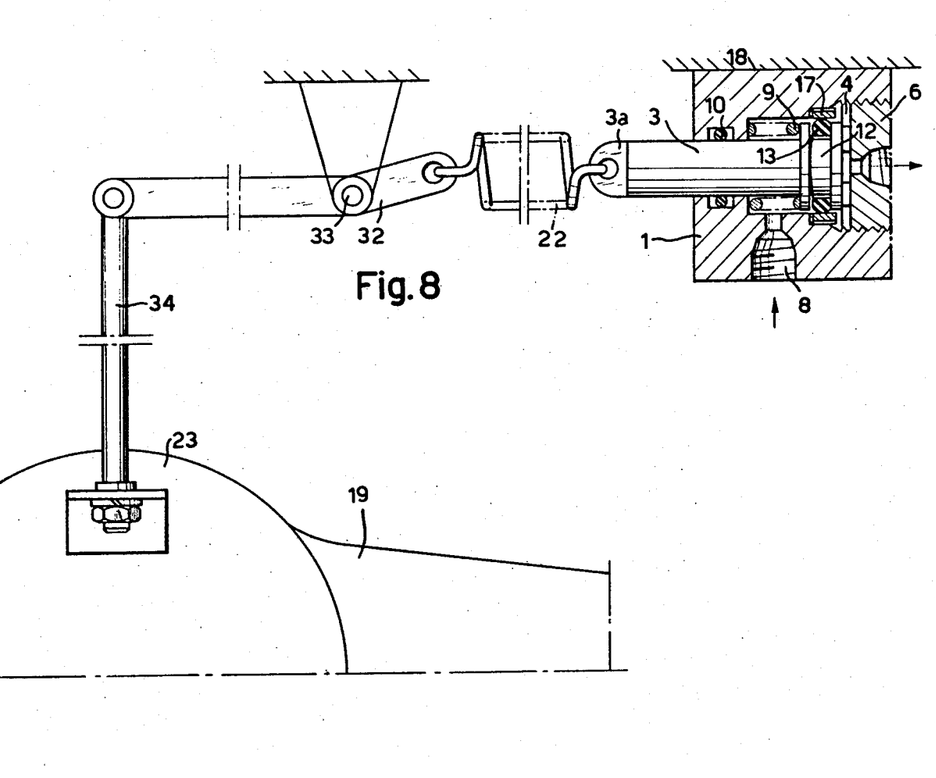

However, the spring 26 is not essential and can be omitted, such as in the embodiment shown in FIGURES 6, 7 and 8, provided the spring 9 opposing protraction or pull back of the piston 2 is of adequate pre-load and stiffness.

An embodiment of the device deprived of an auxiliary spring such as spring 26 described above is shown in FIG. 6. This device is similar in structure to the embodiment shown in FIGURES 2 to 5, but for different configuration of the lever 21 and sealing device presenting leakage of liquid along the piston rod 3.

The device shown in FIG. 7 differs from the embodiment according to FIGURE 6 through the interconnection of the lever 21 and strap 23 welded to the driven axle. The connection comprises a rod 28 secured to the strap 23, extending through a bore 29 formed adjacent the free end of the lever 21. The spring 22 is interposed between two cups 30, 31, secured to the end of the rod 28 and bearing against the lever 21, respectively. In this instance the spring 22 is pre-compressed instead of being stretched, its pre-compression being reduced as the load on the vehicle axle 19 increases. The spring 22 can be of the variable flexibility type.

In the embodiment shown in FIG. 8 the pressure varying device is arranged with a horizontal axis, the end 3a of the rod 3 being fastened to the spring 22 direct, which is articulated at its other end to the end of one arm of a beam 32 articulated at 33 to the vehicle body, the other beam arm being articulated to a rod 34 secured to the strap 23 fast with the axle 19. Obviously, this arrangement does not substantially change operation of the device. However, it is advantageous in that a variable ratio of the deformations of the spring 22 to the relative displacements of the axle 19 and body 18 can be obtained.

Figures 9, 10:
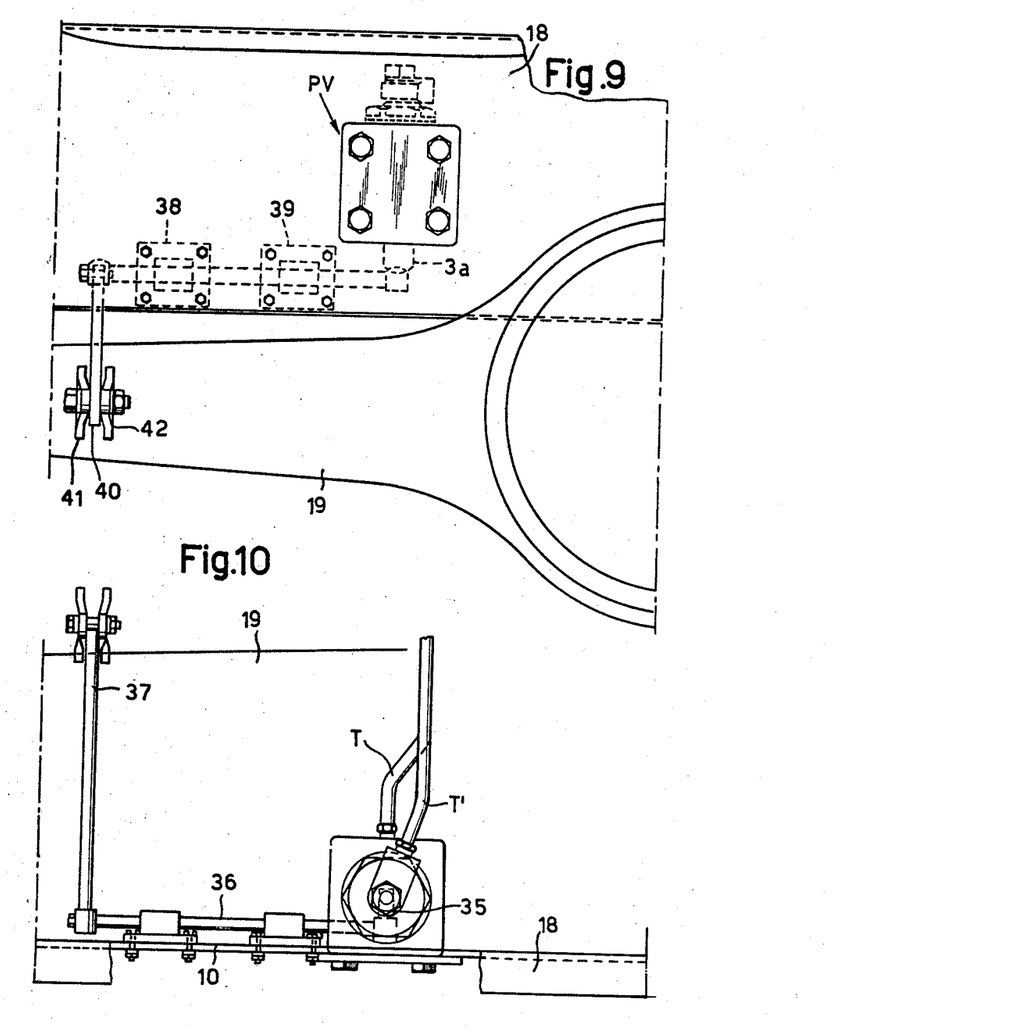
FIGURES 9 and 10 are a part elevational view and plan view, respectively, of a further modified embodiment.

In the embodiment shown in FIGURES 9 and 10 the spring means interposed between the end of the rod 3 and vehicle axle 19 comprises a torque bar composed of three sections 35, 36, 37. The section 36 is supported by bushings 38, 39 secured to the body portion 18 carrying the pressure varying device PV. The bar section 35 in the form of a short lever directly contacts the end 3a of the rod 3 of the piston 2, the section 37 in the form of a longer arm fast with the other end of the section 36 being connected at its end through a link 40 and strap 41 to the vehicle axle by welding at 42.

In this case the action of the torque bar replaces the combined action of the two springs 22, 26 of the device according to FIGURES 2 to 5, or of the spring 22 alone of the devices according to FIGURES 6, 7 or 8. The torque bar is pre-pressed by effect of the torque acting on the bar sections and is capable of maintaining the piston 2 at a position whereat intercommunication of the chambers 4 and 5 of the pressure varying device is established, whereby liquid can flow from the master cylinder to the braking circuit for the rear wheels.

During braking of the vehicle the bar 35, 36, 37 functions similarly to the spring 22 in FIG. 2.

The provision of the above described torque bar affords a reduction in size of the reaction spring 9 arranged in the cylinder of the pressure varying device, whereby the spring merely serves the purposes of positioning, the sealing ring preventing liquid leakage from the cylinder along the piston rod 3.

Figure 12:
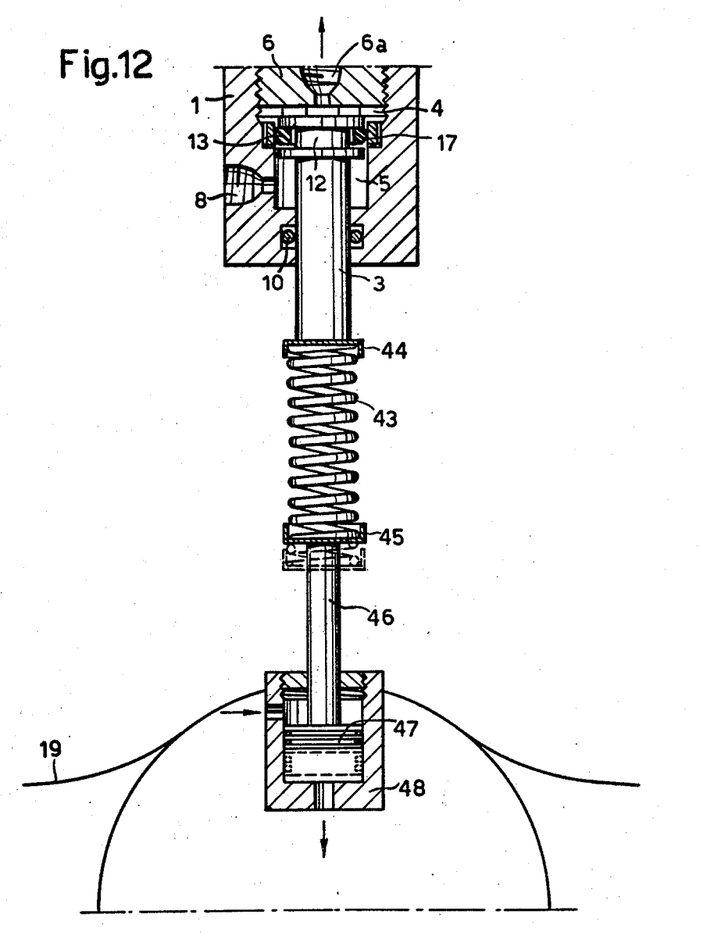

A further simplified structure of the device according to this invention is shown in FIGURE 11. The resilient means interposed between the end of the rod 3 of the piston 2 and rear vehicle axle merely comprises a pre-compressed compression spring 43 interposed between two cups 44, 45 secured to the end of the rod 3 or welded to the axle, respectively.

Where the vehicle is provided with a trimming device, the above structure is slightly modified as shown in FIGURE 12, wherein instead of directly securing the cup 45 to the rear axle, the cup 45 is carried by the end of a rod 46 attached to a piston 47 movable in a small cylinder 48 with which it forms a device responsive to the pressure in the trimming device. The cylinder 48 is secured to the rear axle.

Among all the above-described embodiments, the construction shown in FIGURES 7 and 8, which can be provided with variable flexibility spring means, is more particularly suitable for adapting the strength of the braking force on the rear axle to the theoretical values sequentially required during braking of the vehicle.

Though the device according to the embodiments shown comprises a device reducing the hydraulic pressure transmitted by the master cylinder to the rear wheel vehicle brakes, arranged adjacent the rear vehicle axis, the invention obviously includes an arrangement wherein the pressure varying device is pressure amplifier, as well as an arrangement in which the pressure varying device, whether it reduces or amplifies the hydraulic pressure, respectively, is connected with a braking circuit for one wheel only and is supported, by way of example, from the vehicle frame in proximity to the said wheel, provided spring means is interposed between the piston of the said device and rear axle or the non-suspended vehicle portion, respectively, which supports the wheel having its brake fed through the pressure varying device, the said spring means being adapted to affect, depending upon the load on the axle or said wheel, the conditions under which the piston of the pressure varying device is displaced and, above all, interception of the liquid flow through the pressure varying device between the master cylinder and braking circuit connected to the pressure varying device.

It is understood that within the principle of the invention various details can be widely varied from the example described and shown without departing from the scope of this invention.

What I claim is:

1. Device for use on vehicles equipped with hydraulic brakes and a hydraulic braking circuit, the device adapted to vary the braking force on the vehicle wheels depending upon the vehicle load, characterized by the following combination:

(a) a pressure varying device secured to one of at least two vehicle masses separated by a suspension system, the pressure varying device comprising a cylinder and a piston movable therein which subdivides the cylinder inside into two chambers towards which it exposes faces differing in area, spring means biasing the piston in the cylinder, a normally open valve controlling intercommunication of the said two chambers which are connected to the master cylinder and braking circuit of at least one vehicle wheel, respectively, and said valve intercepting the said intercommunication upon a predetermined value of the pressure transmitted by the master cylinder after the piston which is biased by the spring means has started its movement, (b) each pressure varying device having associated therewith means comprising a resilient member interposed between the piston and the other one of the above mentioned vehicle masses separated by the suspension system, the resilient member forming at least a part of the spring means biasing the piston of the pressure varying device, so that the effect of the pressure varying device is at least partially controlled by the position of the two vehicle masses separated by the suspension and hence by the vehicle load.

2. Device as claimed in claim 1, characterized by the fact that one said chamber of the said pressure varying device with the smaller face area, has extending therethrough the piston rod and is connected with a master cylinder circuit, the other chamber connecting with a braking circuit for one vehicle rear wheel at least, whereby the device acts as a hydraulic pressure reducer in the vehicle braking circuit.

3. Device as claimed in claim 2, characterized by the fact that the pressure reducing device is supported substantially adjacent the rear vehicle axle.

4. Device as claimed in claim 1, characterized by the fact that the said resilient member comprises a coiled spring.

5. Device as claimed in claim 1, characterized by the fact that the resilient member comprises a torque bar.

6. Device as claimed in claim 1, characterized by the fact that the resilient member transmits to the piston of the pressure reducer a thrust in the same direction as the resultant thrust on the piston by the hydraulic pressure transmitted by a master cylinder until the intercommunication of the two above mentioned chambers of the cylinder of the reducer is intercepted by the valve.

References Cited by the Examiner

UNITED STATES PATENTS

| 2,782,881 | 2/57 | Roller | 188—216 |
| 2,805,736 | 9/57 | Paulsen | 188—216 |
| 2,827,986 | 3/58 | Casey et al. | 188—216 |
| 2,991,797 | 7/61 | Baldwin | 303—6 |
| 3,088,285 | 5/63 | Giacosa et al. | 60—54.6 |
| 3,110,362 | 11/63 | Polamin | 188—216 |

FOREIGN PATENTS

| 881,036 | 4/43 | France. |
| 1,125,788 | 3/62 | Germany. |

ARTHUR L. LA POINT, *Primary Examiner.*

EUGENE G. BOTZ, *Examiner.*